(12) United States Patent
Wankowski (10) Patent No.: US 7,188,505 B2
(45) Date of Patent: Mar. 13, 2007

(54) METHOD FOR MAKING BENT STUDS FOR SNOWMOBILE TRACKS (76) Inventor: Russ Wankowski, W293 N3112 Poplar Dr., Pewaukee, WI (US) 53072

( * ) Notice: Subject to any disclaimer, the term of this patent is extended or adjusted under 35 U.S.C. 154(b) by 276 days.

(21) Appl. No.: 10/728,412

(22) Filed: Dec. 5, 2003

(65) Prior Publication Data

US 2005/0120769 A1 Jun. 9, 2005

(51) Int. Cl.
*B21D 53/00* (2006.01)
*B62D 55/26* (2006.01)
(52) U.S. Cl. .................. 72/316; 305/162; 305/180
(58) Field of Classification Search ............ 72/316, 72/380; 29/513
See application file for complete search history.

(56) References Cited

U.S. PATENT DOCUMENTS

| | | | | |
|---|---|---|---|---|
| 2,885,651 A | * | 5/1959 | Moeller | 439/712 |
| 2,990,734 A | * | 7/1961 | Jackson | 72/479 |
| 3,427,849 A | * | 2/1969 | Ainsworth et al. | 72/296 |
| 3,552,086 A | * | 1/1971 | Allen | 52/783.18 |
| 3,973,808 A | * | 8/1976 | Janssen et al. | 305/180 |
| 5,299,860 A | * | 4/1994 | Anderson | 305/180 |
| 5,980,001 A | * | 11/1999 | Rubel | 305/180 |

* cited by examiner

*Primary Examiner*—Daniel C. Crane (57) ABSTRACT

A method and apparatus for producing bent snowmobile studs for use in an assembly are disclosed. The assembly comprises a bent stud having a head and proximal and distal shank portions and a fastener which is adapted to connect with respect to the distal shank portion of the stud. The head and shank of the stud are engaged by members which are mechanically pivoted with respect to one another such that the shank is bent. The assembly prevents rotational movement between the stud and the track.

17 Claims, 13 Drawing Sheets

Fig. 16

METHOD FOR MAKING BENT STUDS FOR SNOWMOBILE TRACKS

FIELD OF THE INVENTION

This invention relates generally to snowmobile tracks and, in particular, to push-through studs for such tracks.

BACKGROUND OF THE INVENTION

Snowmobiles are normally propelled by a resilient belt track driven by drive wheels. Conventional belt tracks typically have transverse lugs for traction. To improve traction, it is well known to mount studs in the belting of the track between the transverse lugs. Snowmobile studs are typically made of hardened carbon steel or other steel alloys for strength and durability purposes. Most studs for ice tracks have a conical, ice-penetrating shank made of hardened steel with an ice-penetrating point which is often carbide.

One common type of stud is a "push-through stud". With a push-through stud, a shank of the stud typically projects perpendicularly from a head of the stud, and the shank is pushed through a bore in the belt track from the interior of the track such that the head contacts the interior side of the track. A backer plate or washer can be tightened onto threads on the shank from the exterior of the belt with a nut. In this manner, any axial movement, i.e., any substantial movement of the head toward or away from the track, is prevented.

Such a connection is sufficient for studs having a straight shank which is perpendicular to the head since rotation of straight studs does not affect traction performance.

However, the Applicant has found that studs including bent shanks can improve snowmobile performance. Studs may include a bent distal tip in order to improve penetration and traction performance. Such bent studs are particularly useful in racing conditions. The bent studs may be connected to a track in the same manner as straight studs, with a nut or similar fastener connected to the stud along the portion of its shank which is perpendicular to the head. When connected, the bent distal tip is "aimed" forward such that when the track moves toward the ground the tip leads the rest of the stud. For studs with shanks that include portions which are not perpendicular to the head, rotation of the stud can severely affect performance. It has been found that in order to prevent rotation of bent studs, the fastener must be frequently tightened as far as possible and the track must be repeatedly checked to ensure that each stud is properly aligned.

While such maintenance can be effective, it is time consuming and is not likely to be accommodated by trail riders or other recreational snowmobilers. Therefore, bent studs would be avoided by such snowmobilers. However, bent studs could provide great benefits to such snowmobilers since the improved traction performance of bent studs allows for use of fewer studs on a track and, therefore, less rotating weight on the track and better performance—including increased fuel efficiency and better acceleration.

Furthermore, bent studs experience great amounts of torque, shear and other forces during use. When racing, due to short term use, worn out or damaged bent studs could be replaced often. However, such frequent replacement is expensive and time consuming.

Therefore, it would be a great advance in the field of snowmobiling to allow for use of bent studs which are locked in position both axially and rotationally. In addition, it would be a great advance in the field to reduce torque and other forces on bent studs to allow for longer use. Furthermore, it would be a great advance to provide a method of commercially producing standardized bent studs for use in snowmobiling.

OBJECTS OF THE INVENTION

Therefore, it is a primary object of this invention to provide a method and apparatus for producing standardized bent studs for use in snowmobiling.

Another object of the invention is to provide a method of mass-producing bent studs for use in snowmobiling.

Another object of the invention is to provide a stud assembly for mounting a bent stud on a snowmobile track which prevents rotational movement between the stud and track.

Another object of the present invention is to provide a stud assembly for mounting a bent stud on a snowmobile track which reduces torque and other forces on the bent stud.

Another object of the present invention is to provide a stud assembly for mounting a bent stud on a snowmobile track which provides for a connection between the stud and track that would allow rotation only about a first axis and a connection between the stud and fastener that would allow rotation only about a second axis which is transverse to the first axis and, therefore, prevents any relative rotation between the track and stud.

Another object of the present invention is to provide a stud assembly for mounting a bent stud on a snowmobile track which includes a stud having a threaded distal portion for connection to a fastener.

Another object of the invention is to provide a track assembly including a snowmobile track and a stud assembly which prohibits relative rotational movement between the track and stud.

It is a still further object and feature of the present invention to provide a stud assembly for mounting a bent stud on a snowmobile track which includes a torque-absorbing spacer.

These and other objects will be apparent from the descriptions of the invention which follow.

BRIEF SUMMARY OF THE INVENTION

The present invention includes a method and apparatus for producing a bent stud for mounting on a snowmobile track. The present invention also includes an assembly for mounting on a snowmobile track to provide superior performance. The invention represents a significant advance over the state of the art by providing novel elements to achieve a novel approach in improving snowmobile performance.

The stud assembly comprises a stud and a fastener adapted for attachment to the stud to fix it in position and orientation relative to the track. The stud includes an elongate shank and a head at the proximal end of the shank. As stated above, such studs are known as push-through studs since the shank portion is pushed and extends through the bore in the track. The stud shank extends from the proximal end to a distal end and is bent, dividing itself into a proximal portion near the proximal end and a distal portion near the distal end. The proximal portion defines a proximal axis and the distal portion defines a distal axis. The proximal and distal axes preferably form an acute angle greater than about 5°, e.g., when the proximal portion is vertical, the distal portion intersects the vertical and forms an angle of at least 5°. More preferably, the angle formed by the proximal and distal axes is between 15° and 30°, or between 20° and 25°. Most preferably, the angle formed by the proximal and distal axes is about 20°. It can be imagined that the hands of a clock approximate such angles when displaying the times of 12:30, 1:30 and 2:30. At the same time, it can be said that the distal axis intersects the plane defined by the stud head at an acute angle less than about 85°, more preferably between about 60° and 75°, and most preferably between about 65° and 70°.

The stud head has a contact surface for engaging the interior side of the track when the shank is pushed through the bore. When the contact surface engages the interior side of the track, the bore and the proximal portion of the shank are preferably substantially coincident.

The fastener is preferably adapted for attachment to the distal portion of the elongate shank, beyond the bend in the shank such that the connection of the fastener to the shank is not coincident with the axis of connection between the track and the shank, i.e., not coincident with the proximal portion or the bore. Because the track bore requires that any rotation be about the proximal axis and the fastener requires that any rotation be about the distal axis, any rotational movement between the stud and the track is impossible after proper connection of the fastener to the distal portion of the shank.

The snowmobile stud assembly preferably includes a torque-absorbing spacer having top and bottom surfaces and an aperture therebetween for receiving the shank. ("Top" and "bottom" and similar terms are used in the specification and claims as description of the figures; however, such orientation phrases are not intended to limit the invention to the orientation shown in the figures, rather they are simply used for convenience and clarity in identification purposes. It is understood that any component can be turned upside down such that a top surface is below a bottom surface.) The top and bottom surfaces preferably form an angle substantially equal to the angle formed by the proximal and distal axes and substantially complementary to the angle formed by the distal axis and the stud head plane. For instance, when axes form an angle of about 20° and the bottom surface is horizontal, the top surface is inclined by about 20° from the horizontal. The torque-absorbing spacer is preferably adapted to be positioned between the fastener and the track such that the fastener engages the top surface when the fastener fixes the stud in position relative to the track. The shape of the spacer allows the spacer to support the distal portion of the shank when interconnected by the fastener and to absorb torque and other forces bearing on the distal portion. The spacer also prevents any rotation of the stud with respect to the track.

The stud assembly preferably further includes a backer plate having top and bottom faces and a hole therebetween for receiving the shank. The backer plate is positioned between the torque-absorbing spacer and the exterior side of the track such that, when the assembly is attached to the track, the contact surface of the head engages the interior side of the track, the bottom face of the backer plate engages the exterior side of the track, the bottom surface of the spacer engages the top face of the backer plate and the fastener engages the top surface of the spacer.

In the preferred assembly, the elongate shank and the fastener include reciprocal threads, like a paired bolt and nut, so that the fastener can be tightened on the distal portion of the shank by rotating the fastener. It is most preferred that the reciprocal threads extend along both the distal and proximal portions of the shank. The fastener is preferably a self-locking nut.

In certain preferred embodiments the snowmobile stud assembly is connected to two track bores such that the stud comprises a first and second stud and the fastener comprises a first and second fastener. For such embodiments, the torque-absorbing spacer includes first and second apertures extending between the spacer's top and bottom surfaces and each aperture receives the shank of a respective stud. The torque-absorbing spacer is adapted to be positioned between each respective fastener and the track such that each fastener engages the top surface of the spacer when the fasteners fix the studs in position relative to the track.

In the certain preferred embodiments adapted for use with two studs and two track bores, the assembly further includes a backer plate having top and bottom faces and first and second holes extending therebetween. Each hole in the backer plate receives a respective stud shank such that, when the assembly is attached to the track, the contact surface of each stud head engages the interior side of the track, the bottom face of the backer plate engages the exterior side of the track, the bottom surface of the torque-absorbing spacer engages the top face of the backer plate, and each fastener engages the top surface of the spacer.

The invention can also be described as a snowmobile track assembly which includes an endless track having an interior side and an exterior side and a bore passing therebetween, a stud having a stud head and a stud shank, and a fastener. The track bore defines a bore axis that is substantially perpendicular to the track adjacent the bore. It is understood that the track, at times during its movement, bends around the drive wheels and may not be "planar" in a macro sense, however, even in such instances the bore axis can be considered to be substantially perpendicular to the track in a micro sense. Furthermore, the bore axis is readily viewed as being perpendicular to the track when the bore is at a linear portion of track between drive wheels.

The stud shank of the track assembly extends through the bore and has a proximal portion defining a proximal axis which is substantially coincident with the bore axis and a distal portion defining a distal axis which forms an angle greater than about 5° with the proximal axis, preferably between about 15° and 30°, and most preferably between about 20° and 25°. The stud head of the track assembly has a contact surface engaging the interior side of the track and forming a plane.

For such snowmobile track assemblies, the fastener is attached to the distal portion of the stud shank such that rotation of the shank about the shank's proximal axis is prevented. The fastener contacts the track such that axial movement of the shank with respect to the track is also prevented.

In the preferred track assembly, the fastener includes a leading surface and the assembly further includes a torque-absorbing spacer with top and bottom surfaces and an aperture therebetween which receives the shank. The top and bottom surfaces of the torque-absorbing spacer form an angle substantially equal to the angle formed by the proximal and distal axes. The torque-absorbing spacer is positioned between the fastener and the track such that the leading surface of the fastener engages the top surface of the torque-absorbing spacer.

It is further preferred that the track assembly include a backer plate having top and bottom faces and a hole therebetween receiving the shank. The backer plate is preferably positioned between the spacer and the track such that the top face engages the bottom surface of the torque-absorbing spacer and the bottom face engages the exterior side of the track.

In another description of the invention, the stud assembly for mounting to a snowmobile track is of the type having a stud shank for passing through a bore in the track, a stud head for contacting an interior side of the track and a fastener for connection to the stud shank to prevent axial movement between the stud shank and the track, with the shank having a proximal portion defining a proximal axis and a distal portion defining a distal axis, and the proximal and distal axes forming an acute angle. In such an assembly the improvement is that the fastener is fixed to the distal portion of the stud shank such that rotational movement between the stud shank and track is prevented.

Another embodiment of the invention is a method for producing bent snowmobile studs. The method comprises providing a stud having a head and substantially straight shank, providing a head engagement member for holding the head relative to the shank, providing a shank engagement member for contacting the shank, engaging the stud head with the head engagement member, engaging the shank with the shank engagement member, and mechanically moving the head engagement member and the shank engagement member with respect to one another such that the shank is bent. In certain embodiments, the head engagement member is fixed and the shank engagement member is movable with respect to the head engagement member.

In certain embodiments, the bent shank defines proximal and distal axes forming an angle between about 15° and 30°. In other embodiments, the proximal and distal axes form an angle between about 20° and 25°. In either embodiment it is sometimes preferable that the shank include threads which remain useful after bending, i.e., a nut can be threaded onto the shank after bending.

Multiple studs may be provided, preferably 4, and the head engagement member may engage the multiple heads, the shank engagement member may engage multiple shanks and multiple shanks may be bent when the head engagement member is moved with respect to the shank engagement member.

The invention also includes an apparatus for producing a bent snowmobile stud. The apparatus comprises a head engagement member for holding the head relative to the shank, a shank engagement member for contacting the shank, a support for positioning the shank engagement member with respect to the head engagement member, and a drive mechanism for moving the support through a course of movement, the shank engagement member engaging and bending the shank during the course of movement.

In certain embodiments, the head engagement member includes a cavity for receiving the head and a slot for allowing the shank to pass out of the head engagement member. In certain apparatus, the head engagement member engages multiple heads, the shank engagement member engages multiple shanks and multiple shanks are bent when the drive mechanism moves the support through the course of movement.

In certain embodiments of the apparatus, the drive mechanism includes a die press and the support includes a sliding block slidingly connected with respect to the die press, a pivoting block pivotably connected with respect to the sliding block, the shank engagement member connected with respect to the pivoting block, and a wheel rotatably attached with respect to the pivoting block, and further including an incline for contacting the wheel to cause the pivoting block to pivot and the shank engagement member to bend the shank. The head engagement member may engage multiple heads, the shank engagement member may include channels aligned with multiple shanks, the shank engagement member may be positioned such that the channels receive the shanks when the die press lowers the sliding block, the sliding block may slide with respect to the die press after the sliding block contacts a fixed member, the incline may continue to be lowered by the die press and contact the wheel to cause the pivoting block and shank engagement member to pivot and to bend the shanks.

The invention also includes a bent stud produced by the method discussed above. The bent stud may be one of multiple bent studs produced by mechanically moving the head engagement member and the shank engagement member with respect to one another a single time.

The bent stud may be used in an assembly comprising an endless track having an interior side and an exterior side and a bore passing therebetween, the bore defining a bore axis substantially perpendicular to the track adjacent the bore, the shank extending through the bore and having a proximal portion defining a proximal axis substantially coincident with the bore axis and a distal portion defining a distal axis forming an angle greater than about 5° with the proximal axis; the head having a contact surface engaging the interior side of the track, and a fastener attached to the distal portion of the shank such that rotation of the shank about the proximal axis is prevented, the fastener contacting the track such that axial movement of the shank with respect to the track is prevented. The fastener may include a leading surface and the assembly may further comprise a torque-absorbing spacer having top and bottom surfaces and an aperture therebetween receiving the shank, the top and bottom surfaces forming an angle substantially equal to the angle formed by the proximal and distal axes, the torque-absorbing spacer positioned between the fastener and the track such that the leading surface of the fastener engages the top surface of the torque-absorbing spacer. The assembly may further comprise a backer plate having top and bottom faces and a hole therebetween receiving the shank, the backer plate positioned between the spacer and the track such that the top face engages the bottom surface of the torque-absorbing spacer and the bottom face engages the exterior side of the track. The shank and fastener may include reciprocal threads and the fastener may be a self-locking nut.

BRIEF DESCRIPTION OF THE DRAWINGS

The drawings illustrate a preferred embodiment of the invention in which the above features are shown as well as others which will be readily understood from the following description of the illustrated embodiment. In the drawings.

DETAILED DESCRIPTION OF THE DRAWINGS

Referring to FIGS. 1, 2, 3a, 3b and 4, a track assembly in accordance with the present invention is generally designated by the reference numeral 10. Assembly 10 is shown including a stud 20 having a shank 28 and head 29, a fastener 30, a torque-absorbing spacer 40 and a backer plate 50 and is mounted to track 12.

Stud 20 is preferably high strength alloy steel and extends from a proximal end 21 to a distal end 23 and includes a proximal portion 25 defining a proximal axis 27 and a distal portion 24 defining a distal axis 26. Distal end 23 may include a carbide point. Proximal and distal axes 27,26 intersect to form an acute angle 22 which shown as being approximately 25°. Stud 20 is pushed through bore 16 in track 12 such that contact surface 19 of head 29 contacts interior side 13 of track 12.

Backer plate 50 is preferably aluminum and includes a hole 53 which receives shank 28. Bottom face 52 of backer plate 50 contacts exterior side 14 of track 12 when assembled. Torque-absorbing spacer 40 is preferably aluminum and includes an aperture 43 which receives shank 28. Bottom surface 42 of spacer 40 contacts top face 51 of backer plate 50 when assembled. Aperture 43 is preferably formed to be perpendicular with top surface 41. Fastener 30 is preferably a lock nut and includes a channel 32 which receives shank 28. Leading surface 31 of fastener 30 contacts top surface 41 of spacer 40 when assembled.

When stud 20 is positioned in bore 16 of track 12, shank 28 is rotated about proximal axis 27 until distal portion is angled toward the direction of track motion (shown by arrow A in FIG. 1) so that distal end 23 can dig into any ice or hard-packed surface over which the snowmobile travels. Then backer plate 50 is slid over shank 28 so that proximal portion 25 is received within hole 53. Next, torque-absorbing spacer 40 is slid over shank 28 so that distal portion 24, or the interface between proximal and distal portions 25,24, is positioned within aperture 43. Finally, fastener 30 is connected to shank 28 so that fastener 30 compresses each component between contact surface 19 of head 29 and leading surface 31 of fastener 30. In doing so, a first connection plane is created and defined by interior surface 13 of track 12 and contact surface 19 of head 29 and a second connection plane is created by leading surface 31 of fastener 30 and top surface 41 of torque-absorbing spacer 40. The first and second connection planes are transverse, with proximal axis 27 perpendicular to the first connection plane and distal axis 26 perpendicular to the second connection plane.

Figure 1:
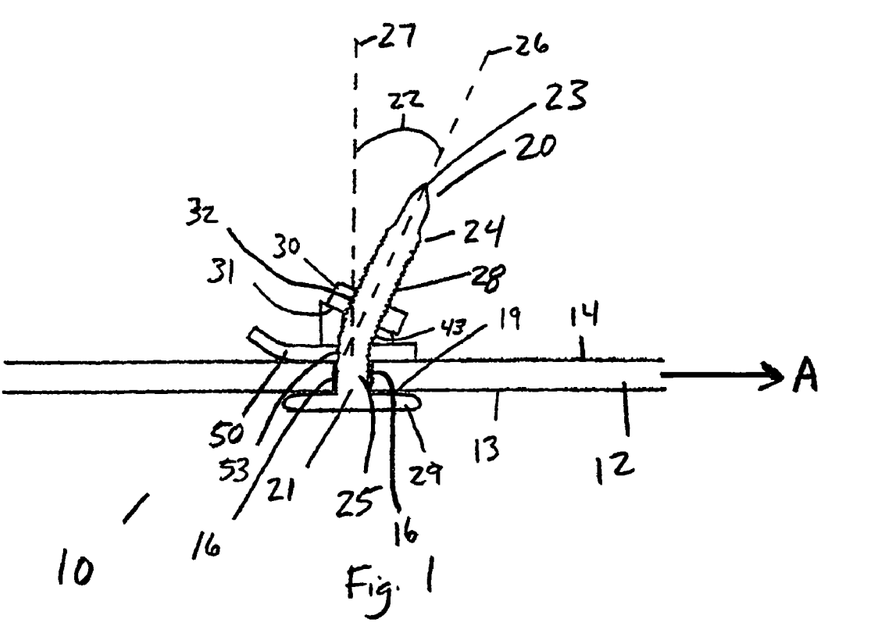
FIG. 1 is a cross sectional view of the assembly in accordance with the invention.
Figure 2:
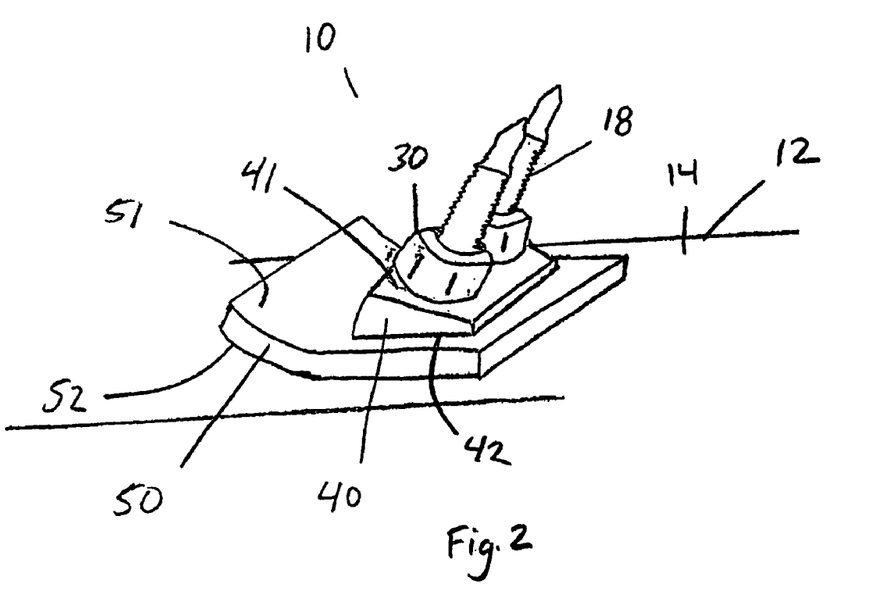
FIG. 2 is a perspective view of an embodiment in which two studs are attached to a backer plate and torque-absorbing spacer in accordance with the invention.
Figure 3A:
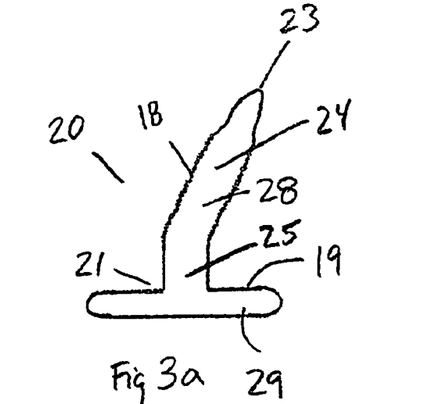
FIGS. 3a and 3b are enlarged cross sectional views of each assembly component shown in accordance with the invention, but when not in engagement.
Figure 3B:
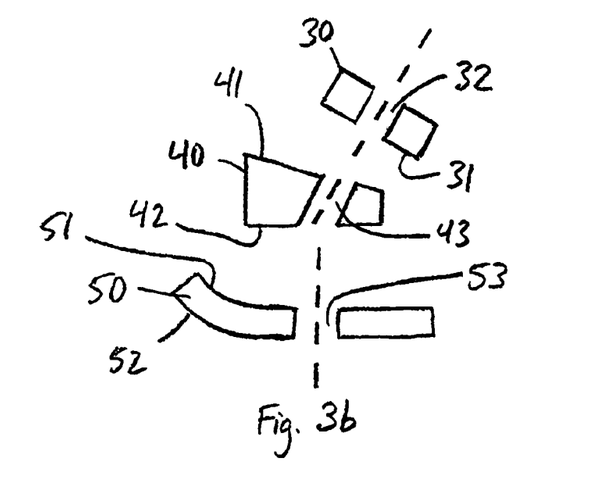

The interface between leading surface 31 of fastener 30 and top surface 41 of torque-absorbing spacer allows rotation of the shank 28 only about distal axis 26. The interface between contact surface 19 of head 29 and interior surface 13 of track 12 allows rotation of the shank 28 only about proximal axis 27. Therefore, any rotation of stud 20 is prohibited since stud 20 cannot rotate about any axis. In this manner, stud 20 is securely locked into position and orientation relative to track 12.

Figure 4:
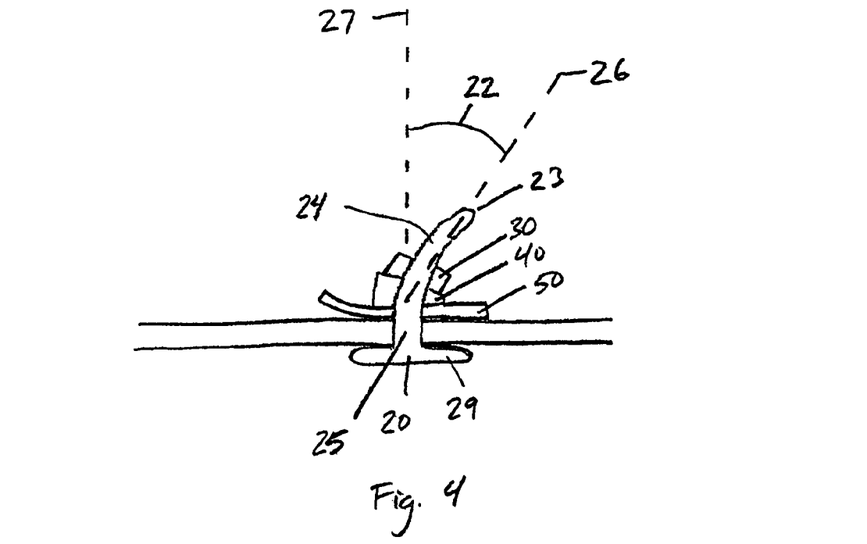
FIG. 4 is a cross sectional view of an alternate stud in accordance with the invention.

FIG. 4 depicts an alternate stud 20 which utilizes a curved shank 25 with only one linear portion (proximal portion 25) rather than a bent shank which has two linear portions. Although distal portion 24 is not linear, it is understood to define distal axis 26 which passes through a point near distal end 23 and a point near where proximal portion 25 ends. Distal axis 26 intersects proximal axis and the stud head plane as in the preferred embodiment.

Figure 5:
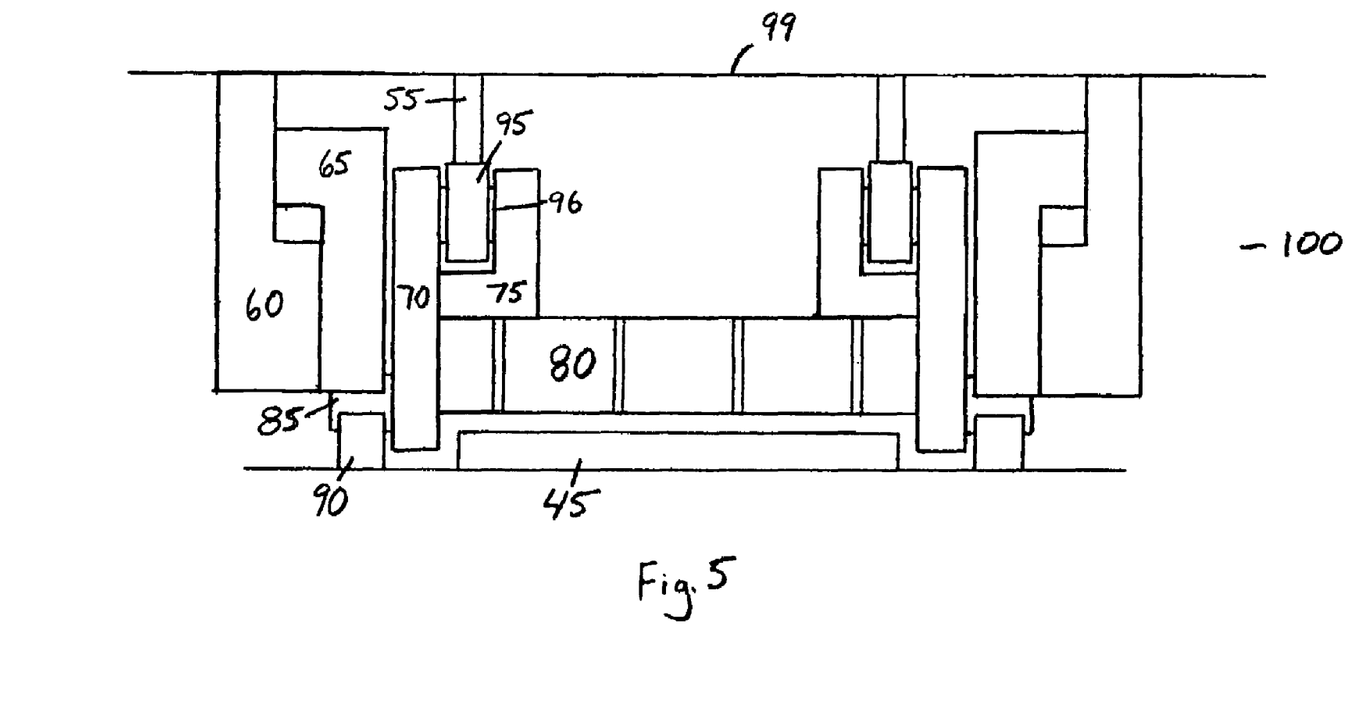
FIG. 5 is a rear plan view of the apparatus for producing bent studs in accordance with the invention.

FIG. 5 depicts an apparatus 100 for producing bent studs. Apparatus 100 includes a slotted block 60 connected to die press 99. A sliding block 65 is slidingly connected to slotted block 60 by bolts 61,62 which pass through slots 64,66 in slotted block 60 and through holes 68,69 in sliding block. A pivoting block 70 is connected with respect to sliding block 65 through pivot rod 85. Arm support 75 is connected to pivoting block 70 and forms therebetween wheel void 76. A wheel 95 is positioned in wheel void 76 and rotates about axle 96 which is mounted in axle opening 74 of pivoting block 70 and in axle opening 77 of arm support 75. Shank engagement member 80 is connected with respect to arm support 75 and pivoting block 70 such that shank engagement member 80, arm support 75, wheel 95, and pivoting block 70 all pivot about pivot rod 85. Contact between wheel 95 and incline 55 causes such pivoting about pivot rod 85 when pivot rod 85 is receiving by rod engagement member 90 and incline 55 is lowered by press 99 into contact with wheel 55.

Figure 6:
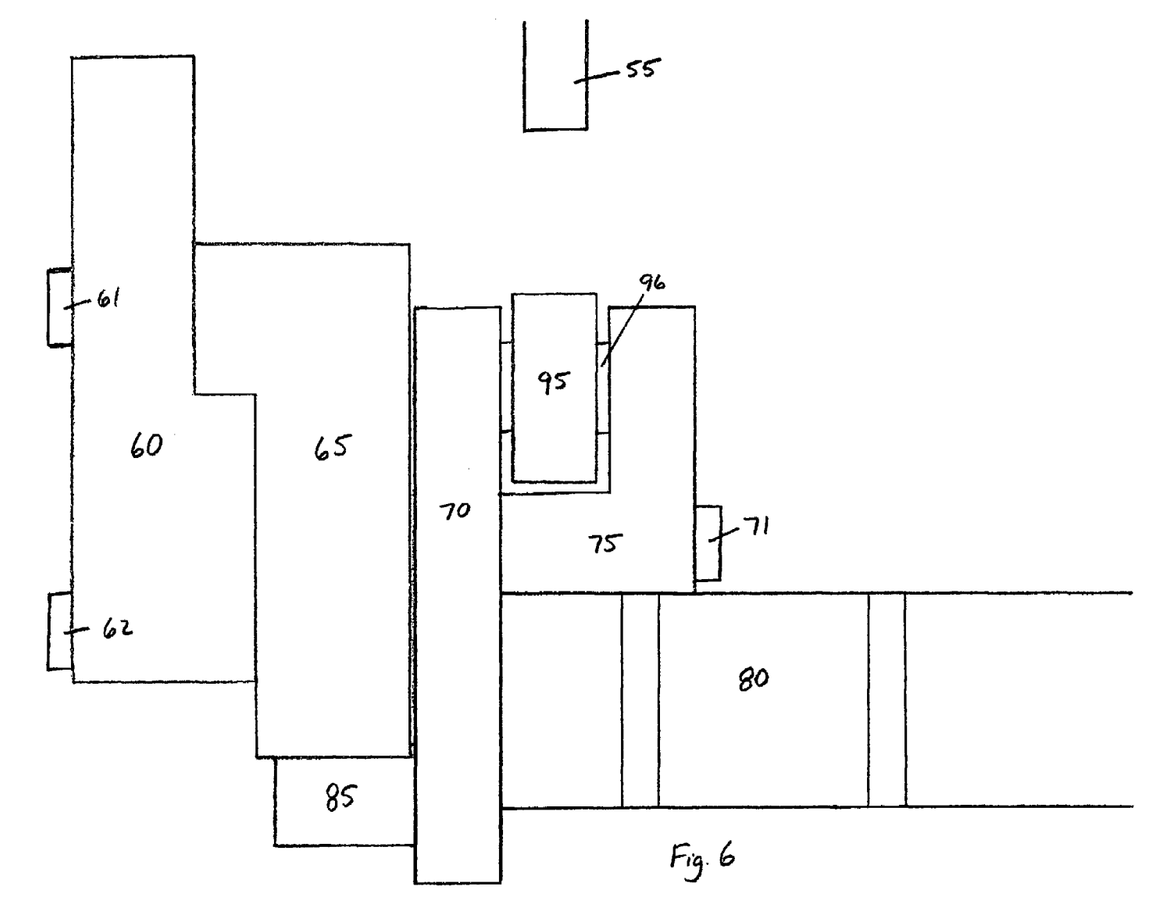
FIG. 6 is an enlarged plan view of the leftside of FIG. 5, but showing the slidable portion at its full downward extension in accordance with the invention.
Figure 7:
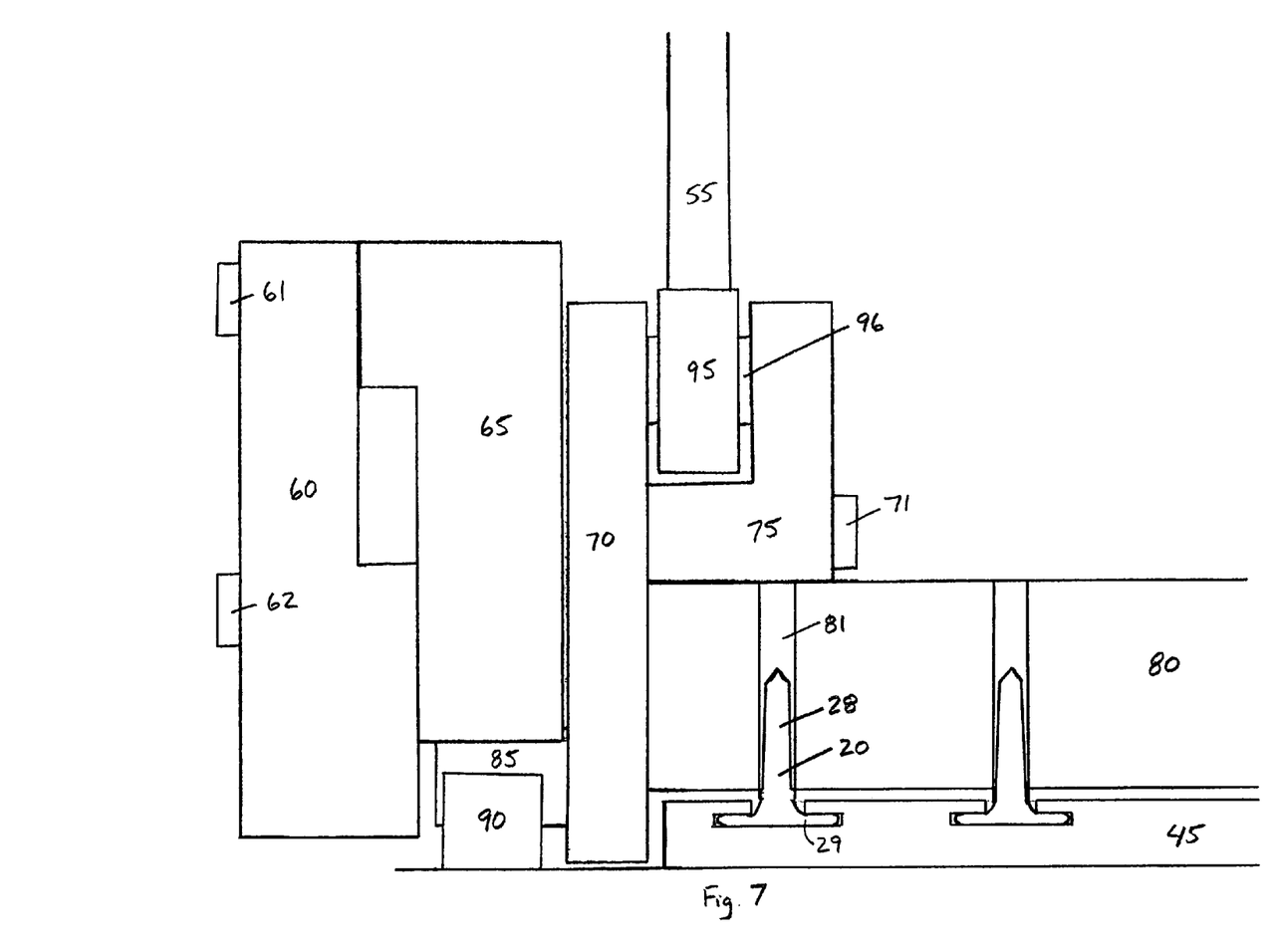
FIG. 7 is an enlarged plan view similar to FIG. 6, but showing the slidable position at is full upward retraction in accordance with the invention.

FIG. 6 is an enlarged view of the left side of apparatus 100. As shown, sliding block 65 is completely extended downward such that shoulder 63 and shoulder 67 are in contact. As press 99 lowers slotted block 60, pivot rod 85 will contact rod engagement member 90 as shown in FIG. 7. When such contact is made, sliding block 65 stays still while slotted block 60 continues to move downward (sliding block 65 slides with respect to slotted block 60). Eventually incline 55, which is also being moved downward by press 99, contacts wheel 95 and causes pivoting of shank engagement member 80 and the other pivoting components. FIG. 7 also shows the receipt of shanks 28 of studs 20 within channels 81. Channels 81 are preferably open-sided so that shank engagement member 80 can freely pivot back to vertical after bending shanks 28.

Figure 8:
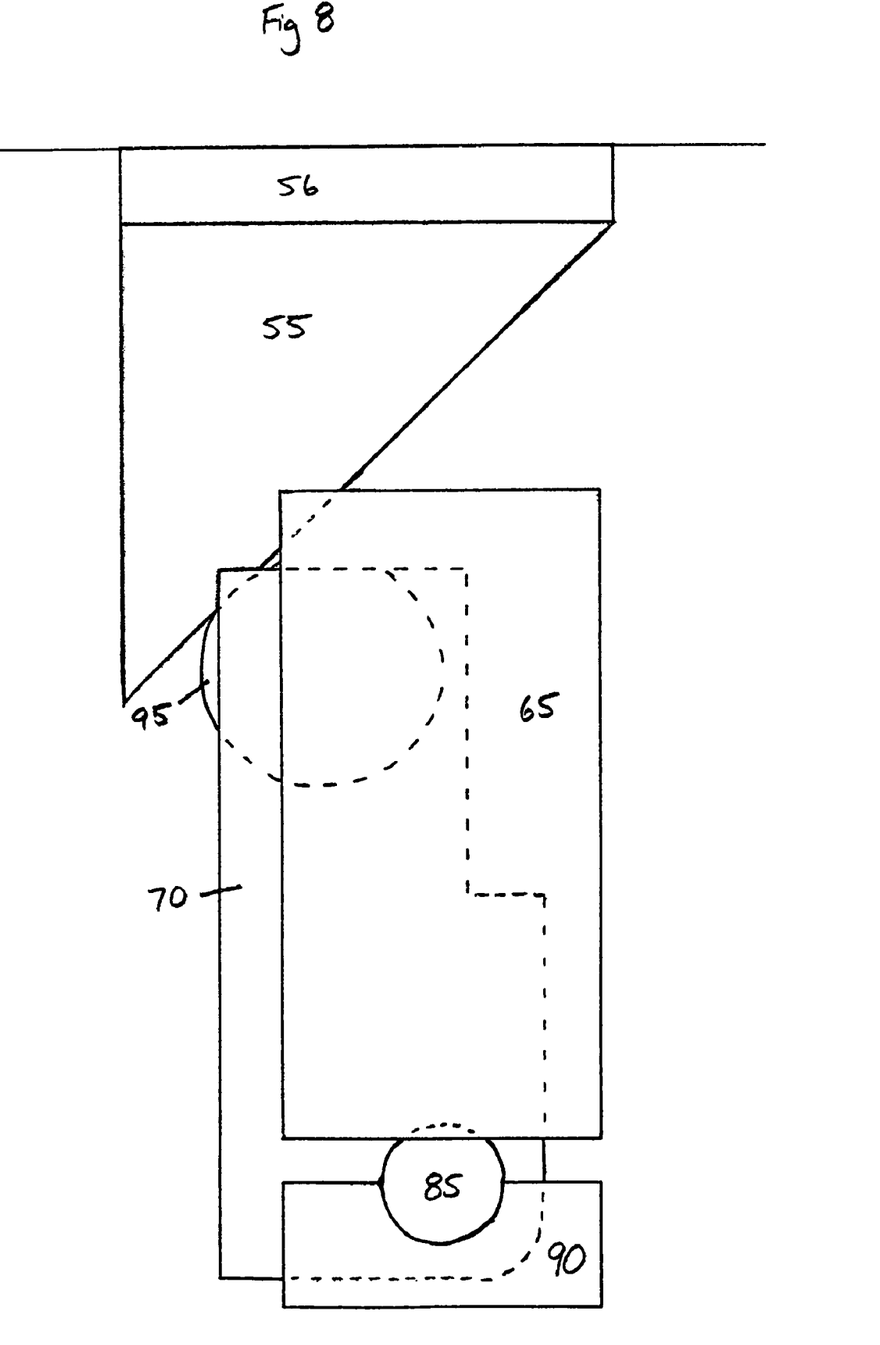
FIG. 8 is a side view of the wheel mounted to the pivoting block upon initial contact with the incline in accordance with the invention.
Figure 9:
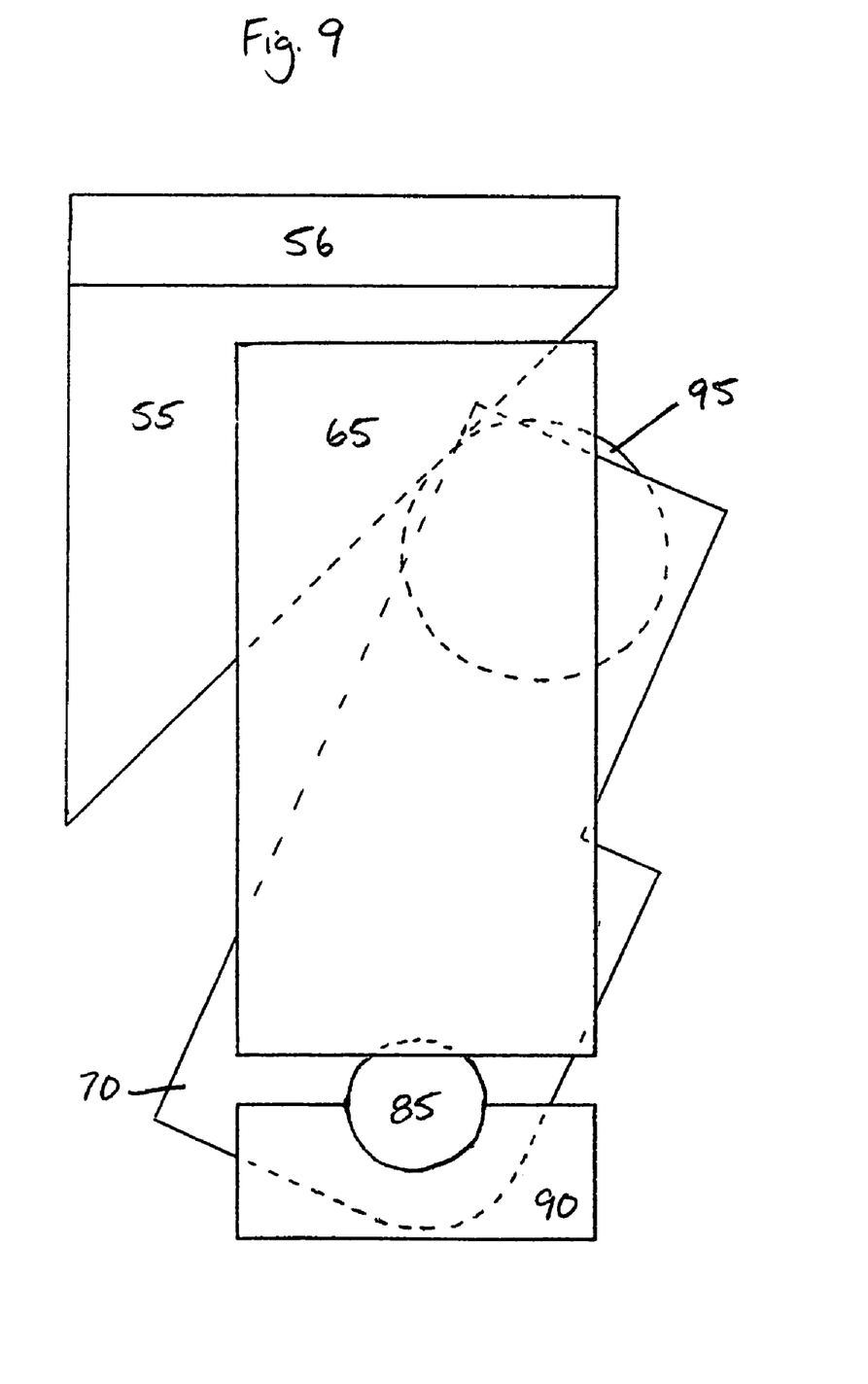
FIG. 9 is a side view similar to FIG. 8, but showing the incline lowered and the pivoting block pivoting about the pivot rod in accordance with the invention.
Figure 10A:
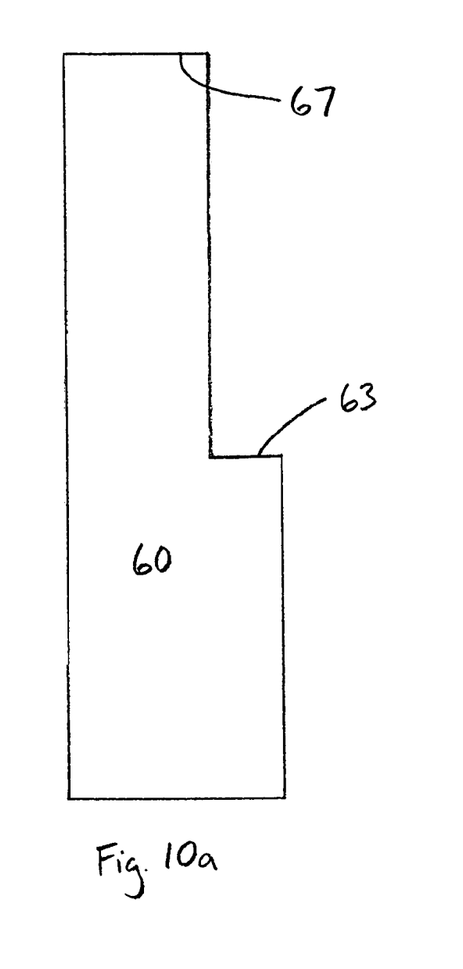
FIGS. 10a and 10b be are rear and side plan views of a slotted block in accordance with the invention
Figure 10B:
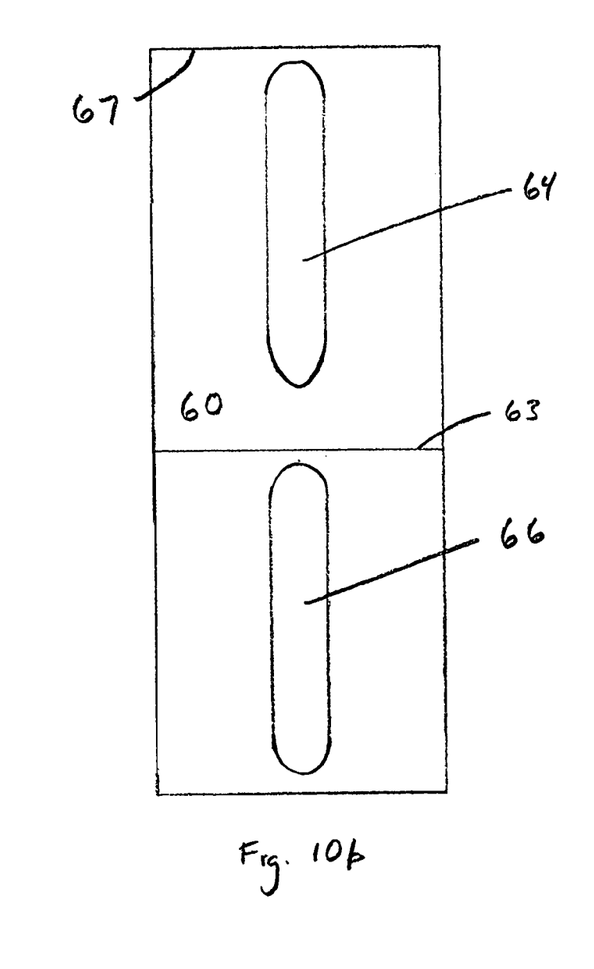
Figure 11A:
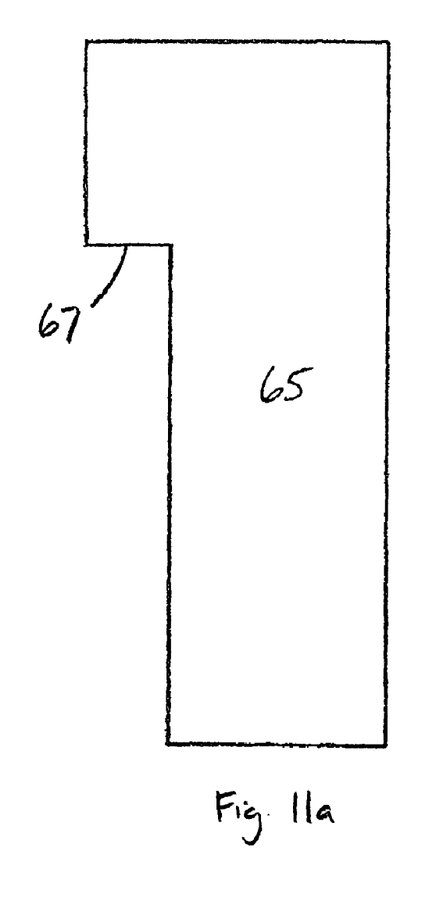
FIGS. 11a and 11b are rear and side plan views of a sliding block in accordance with the invention.
Figure 11B:
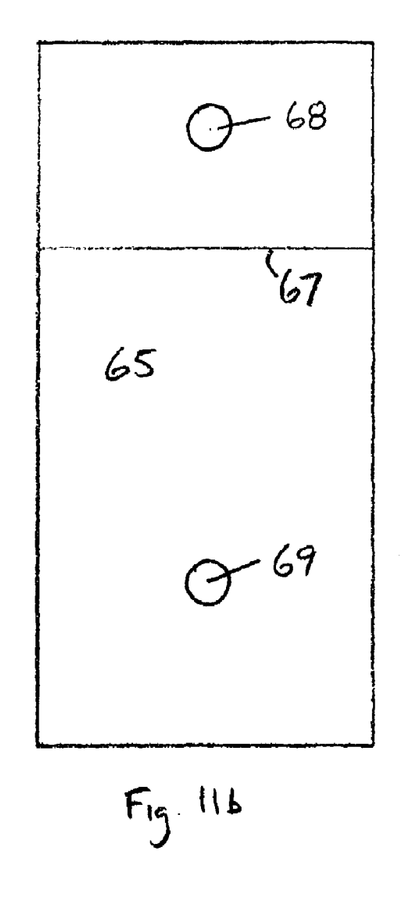
Figure 12A:
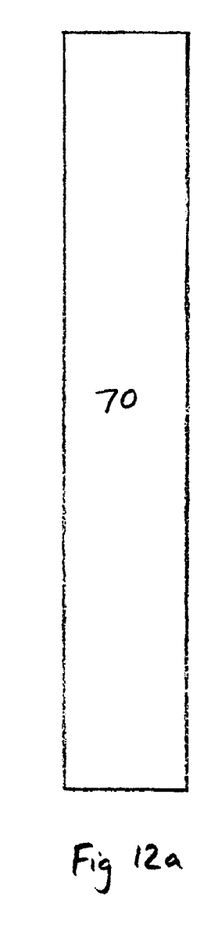
FIGS. 12a and 12b are rear and side plan views of a pivoting block in accordance with the invention.
Figure 12B:
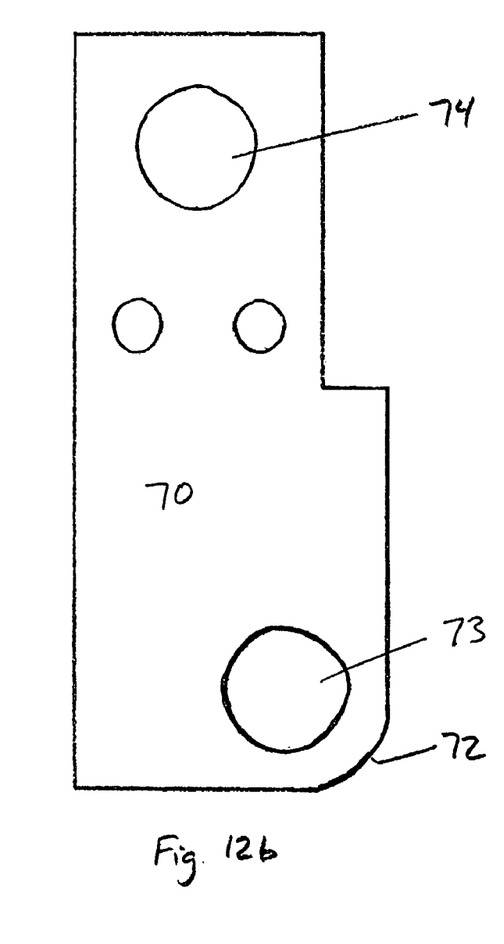
Figure 13A:
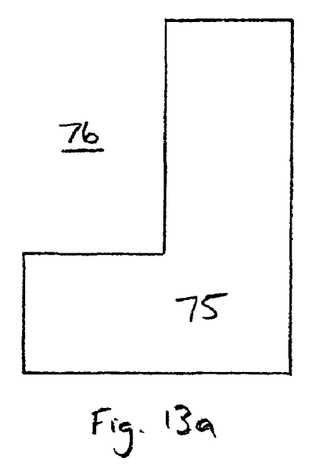
FIGS. 13a and 13b are rear and side plan views of an arm support in accordance with the invention.
Figure 13B:
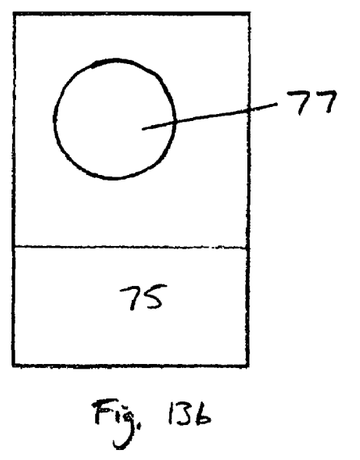
Figure 14A:
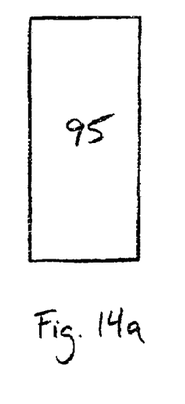
FIGS. 14a and 14b are rear and side plan views of a wheel in accordance with the invention.
Figure 14B:
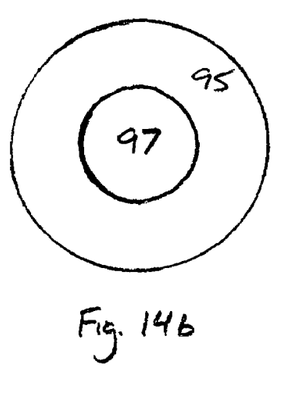
Figure 15A:
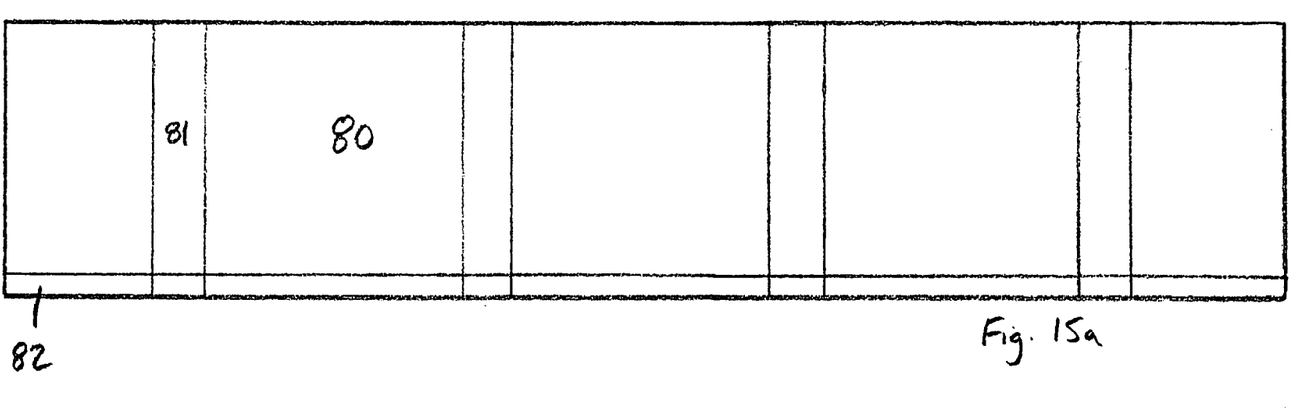
FIGS. 15a and 15b are rear and side plan views of a shank engagement member in accordance with the invention.
Figure 15B:
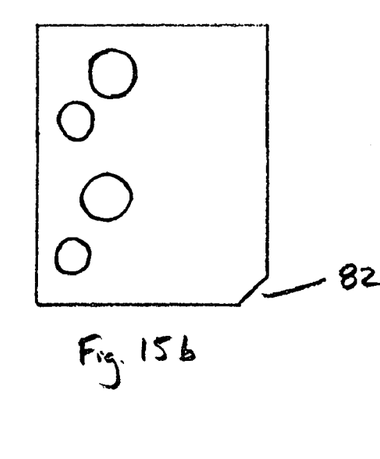

FIG. 8 shows the initial contact between wheel 95 and incline 55. As shown, pivoting block 65 has not yet begun to pivot about pivot rod 85. FIG. 9 shows incline 55 having moved downwardly and contacted wheel 95, forcing wheel 95 to cause pivoting block 70 to pivot about pivot rod 85. As is understood, after full downward extension of incline 55, incline 55 and slotted block 60 are raised by press 99 and shank engagement member 80 pivots back to a vertical position before being lifted away from head engagement member 45.

Figure 16:
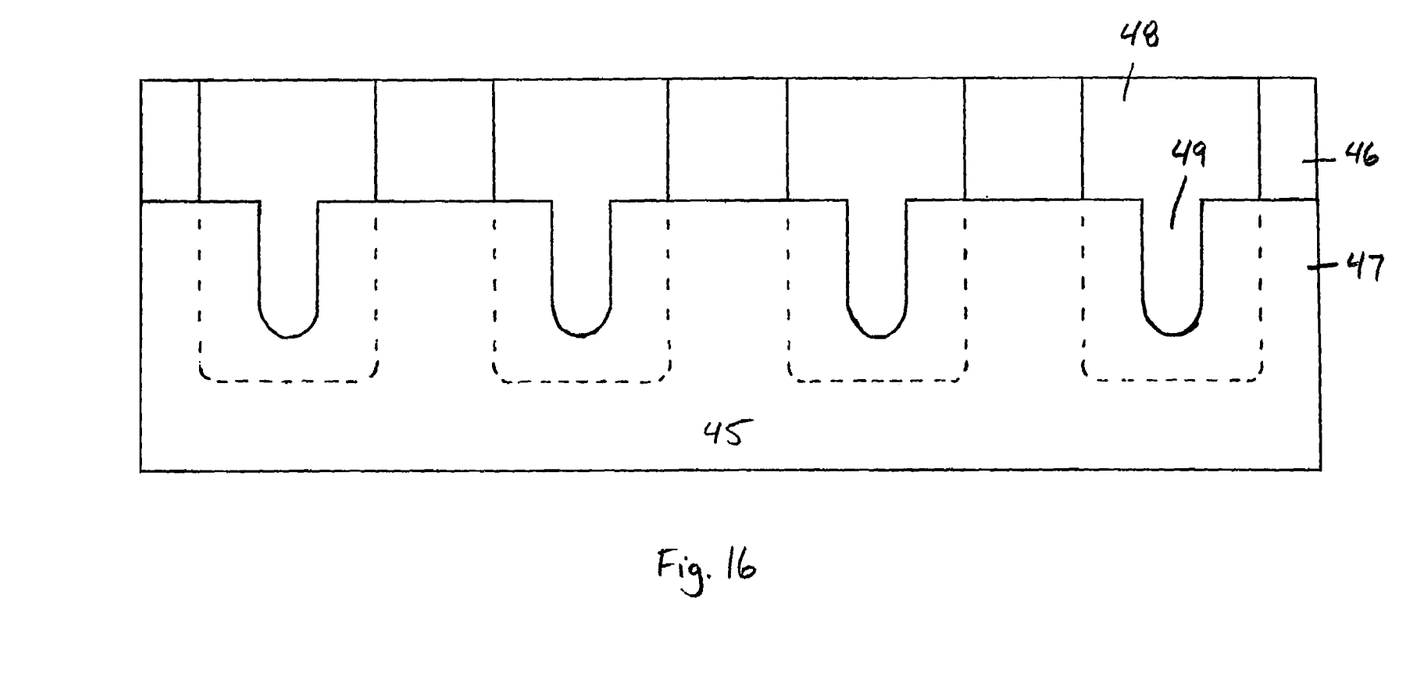
FIG. 16 is an overhead plan view of the head engagement member in accordance with the invention.

As shown in FIGS. 7 and 16, head engagement member 45 includes head-receiving cavity 48 formed by a bottom portion 46 and a shank groove 49 formed by a top portion 47 which allows shanks 28 to pass out of head engagement member 45. It is preferred that head-receiving cavity 48 open toward the front of apparatus 100 to allow for easy position and removal of studs 20 from apparatus 100. As such, the direction of bending of the shanks is toward the closed end, thereby providing secure engagement between studs 20 and head engagement member 45.

Various modes of carrying out the invention are contemplated as being within the scope of the following claims particularly pointing out and distinctly claiming the subject matter which is regarded as the invention.

The invention claimed is:

1. A method for producing bent snowmobile studs, the method comprising:
   providing a stud having a head and substantially straight shank;
   providing a head engagement member for holding the head relative to the shank;
   providing a shank engagement member for contacting the shank;
   engaging the stud head with said head engagement member, engaging the shank with said shank engagement member; and
   mechanically moving the head engagement member and the shank engagement member with respect to one another such that the shank is bent, wherein a plurality of the studs are provided and said head engagement member engages a plurality of the stud heads, said shank engagement member engages the plurality of the shanks and the plurality of the shanks being bent when said head engagement member is moved with respect to said shank engagement member.

2. The method of claim 1 wherein the bent shank defines proximal and distal axes, the proximal and distal axes forming an angle between about 15° and 30°.

3. The method of claim 2 wherein the proximal and distal axes form an angle between about 20° and 25°.

4. The method of claim 1 wherein the shank includes threads and wherein the threads remain useful after bending.

5. The method of claim 1 wherein the head engagement member is fixed and said shank engagement member is movable with respect to said head engagement member.

6. A method for producing bent snowmobile studs, the method comprising:
   providing a stud having a head and substantially straight shank;
   providing a head engagement member for holding the head relative to the shank;
   providing a shank engagement member for contacting the shank, pivotally engaging said shank engagement member with said head engagement member; and
   engaging the stud head with said head engagement member, engaging the shank with said shank engagement member; and
   mechanically moving the head engagement member and the shank engagement member with respect to one another such that the shank is bent, removing said head engagement member and said shank engagement member from the stud.

7. The method of claim 6 wherein the bent shank defines proximal and distal axes, the proximal and distal axes forming an angle between about 15° and 30°.

8. The method of claim 7 wherein the proximal and distal axes form an angle between about 20° and 25°.

9. The method of claim 6 wherein the shank includes threads and wherein the threads remain useful after bending.

10. The method of claim 6 wherein a plurality of the studs are provided and said head engagement member engages a plurality of the stud heads, said shank engagement member engages the plurality of the shanks and the plurality of the shanks being bent when said head engagement member is moved with respect to said shank engagement member.

11. The method of claim 6 wherein the head engagement member is fixed and said shank engagement member is movable with respect to said head engagement member.

12. A method for producing bent snowmobile studs, the method comprising:
   providing a stud having a head and substantially straight shank;
   providing a head engagement member for holding the head relative to the shank;
   providing a shank engagement member for contacting the shank; and
   engaging the stud head with said head engagement member, engaging the shank with said shank engagement member; and
   mechanically moving the head engagement member and the shank engagement member with respect to one another such that the shank is bent, removing said head engagement member and said shank engagement member from the stud.

13. The method of claim 12 wherein the bent shank defines proximal and distal axes, the proximal and distal axes forming an angle between about 15° and 30°.

14. The method of claim 13 wherein the proximal and distal axes form an angle between about 20° and 25°.

15. The method of claim 12 wherein the shank includes threads and wherein the threads remain useful after bending.

16. The method of claim 12 wherein a plurality of the studs are provided and said head engagement member engages a plurality of the stud heads, said shank engagement member engages the plurality of the shanks and the plurality of the shanks being bent when said head engagement member is moved with respect to said shank engagement member.

17. The method of claim 12 wherein the head engagement member is fixed and said shank engagement member is movable with respect to said head engagement member.

* * * * *